(12) United States Patent
Mellema (10) Patent No.: US 7,292,248 B2
(45) Date of Patent: Nov. 6, 2007

(54) TECHNIQUE FOR STORING AND DISPLAYING COMPUTER TEXT

(76) Inventor: John T. Mellema, 16496 124th Ave., Nunica, MI (US) 49448

( * ) Notice: Subject to any disclaimer, the term of this patent is extended or adjusted under 35 U.S.C. 154(b) by 201 days.

(21) Appl. No.: 11/048,203

(22) Filed: Feb. 1, 2005

(65) Prior Publication Data

US 2006/0170686 A1    Aug. 3, 2006

(51) Int. Cl.
- G06T 11/00    (2006.01)
- G06F 15/00    (2006.01)
- G06F 17/00    (2006.01)
- B41J 5/00     (2006.01)

(52) U.S. Cl. .................. 345/467; 715/542; 400/486

(58) Field of Classification Search ...... 345/468–472.3
See application file for complete search history.

(56) References Cited

U.S. PATENT DOCUMENTS

| 4,262,291 A | * | 4/1981 | Zammit et al. ............... 345/50 |
| 4,323,893 A | * | 4/1982 | Ypsilantis et al. ............ 345/33 |
| 4,447,810 A | * | 5/1984 | Lefebure .................... 345/30 |
| 4,647,924 A | * | 3/1987 | Naqib ........................ 345/33 |
| 5,034,602 A |   | 7/1991 | Garcia, Jr. et al. |
| 5,387,042 A |   | 2/1995 | Brown |

FOREIGN PATENT DOCUMENTS

GB    2001468 A    *    1/1979

* cited by examiner

*Primary Examiner*—Ulka Chauhan
*Assistant Examiner*—Eric Woods
(74) *Attorney, Agent, or Firm*—Price, Heneveld, Cooper, DeWitt & Litton, LLP (57) ABSTRACT

A technique for storing displayable computer text comprises a number of steps. Initially, each of a plurality of language characters is assigned to an appropriate sized stick frame, which includes a plurality of vertical and horizontal segments, in order to provide a different graphical representation for each of the language characters. Next, the technique determines which of the vertical and horizontal segments are on and which of the vertical and horizontal segments are off in the stick frame for each of the language characters. Then, a different number is assigned to each of the language characters, based upon the stick frame size and the status of each of the vertical and horizontal segments in the stick frame.

6 Claims, 5 Drawing Sheets

TECHNIQUE FOR STORING AND DISPLAYING COMPUTER TEXT

BACKGROUND OF THE INVENTION

The present invention is generally directed to computer text and, more specifically, to a technique for storing and displaying computer text.

Historically, hundreds of different encoding systems have been utilized within computer systems to assign numbers to computer text, e.g., characters of a given language. As is well known, computer systems deal with numbers and store letters and other characters by assigning a number for each character. Unfortunately, many encoding systems have conflicted with one another in that different encoding systems have used the same number for different characters or used different numbers for the same character. As such, in computer systems that have implemented different encoding systems, there has been a need to support multiple encodings such that when data was passed between different encodings or platforms the data could be utilized without risk of corruption.

To address this problem, a number of computer related manufacturers have adopted the Unicode standard, which has enabled a single software product or a single website to be targeted across multiple platforms, languages and countries without re-engineering. Unicode has provided a unique number for many language characters irrespective of the platform, program, or language that is implemented. In this manner, a computer system incorporating Unicode allows for data to be transported across different systems without corruption.

The Unicode Standard allocates 16 bits that are each either on or off to represent the numeric value of a character in the Unicode ordering. This allows for characters numbered from zero through 2^16-1, or 65,535. Not all of these 65,535 possible numeric values currently have a character associated with them. When a new character is added to the Unicode Standard, the numeric value that will represent the new character is chosen by the Unicode Technical Committee. The numeric value chosen for some Unicode characters is based on the character's ordering in some language. For example, the English language character 'A' has the numeric value of 65 in Unicode followed by the character 'B' with the numeric value of 66, followed by the character 'C' with the numeric value of 67, and so on through 'Z' with the numeric value of 90 in Unicode. However, there is no logical relationship between the shape of a character and its numerical value representation in Unicode. For this reason, most users of Unicode could not enter the correct numeric value of a new character shape that they wish to display without viewing a table that shows each Unicode character and its corresponding numeric value. Searching a table of 65,535 entries can be very time consuming and even after searching all 65,535 entries for a desired character shape, it is possible that the desired character shape has no associated numerical value in Unicode.

What is needed is a technique that addresses the need for time-consuming searches of numeric values to find a desired character shape. It would also be desirable for the technique to address the problem of some character shapes having no associated numerical value by using a process to generate a numeric value for every possible character, based on its shape.

SUMMARY OF THE INVENTION

According to the present invention, a technique is described for storing displayable computer text as a numeric value, based on the shape of the character to be stored. The technique assigns each of a plurality of language characters to an appropriate sized stick frame, which includes a plurality of vertical and horizontal segments, in order to provide a different graphical representation for each of the language characters. The technique determines which of the vertical and horizontal segments are on and which of the vertical and horizontal segments are off in the stick frame for each of the language characters. A different number is then assigned to each of the language characters, based upon the dimensions of the stick frame that represents the character and the status of each of the vertical and horizontal segments in the stick frame.

According to another aspect, the language characters include a plurality of language symbols. According to another embodiment, the step of assigning each of the plurality of language characters to the appropriate sized stick frame in order to provide a different graphical representation for the language characters further comprises the step of: entering a frame height and width for each of the language characters that are to be defined. In general, the frame height defines the number of the vertical segments from top to bottom in the stick frame and the frame width defines the number of horizontal segments from left to right in the stick frame. According to yet another aspect, the step of assigning a different number to each of the language characters, based upon the status of each of the vertical and horizontal segments in the stick frame, further comprises the step of: determining the different number for each of the language characters based upon the location of each stick in the stick frame that is on. According to this aspect, the stick corresponds to one of the vertical or horizontal segments.

According to yet another embodiment, the technique includes verifying that the assigned different numbers for each of the language characters are valid for the entered frame height and width. According to another aspect, each of the vertical and horizontal segments includes a predetermined number of display pixels.

These and other features, advantages, and objects of the present invention will be further understood and appreciated by those skilled in the art by reference to the following specification, claims, and appended drawings.

DETAILED DESCRIPTION OF PREFERRED EMBODIMENT

According to the present invention, a technique is disclosed herein that assigns a frame size and a number of sticks to each of a plurality of language characters. The frame size consists of a number of rows and columns of sticks, which are individual vertical and horizontal segments that may be made up of a number of pixels, depending upon the display type. It should be appreciated that each of the sticks does not have to be straight i.e., the sticks may be curved or arced to, for example, provide different fonts. In this case, a segment referred to as a vertical segment is substantially vertical and a segment referred to as a horizontal segment is substantially horizontal. As utilized herein, the term 'stick-pile' means a combination of stick statuses and a certain sized frame tat may or may not correspond to a valid character. As is shown in FIG. 1A, the character 'A' has a frame size of two rows by one column (i.e., two rows of vertical sticks and one column of horizontal sticks between the rows of vertical sticks) and includes seven total sticks, i.e., sticks 0-6. Bach stick can either be on or off. As is shown in FIG. 1A, the character 'A' has a two row by one column frame size and has the sticks 0, 1, 2, 3, 5 and 6 turned on and the stick 4 turned off. The stick-pile 108A for the character 'A' in a two row by one column frame has a stick-pile number of 111, i.e., $2^0+2^1+2^2+2^3+2^4+2^5+2^6=111$. It should be appreciated tat other number schemes for the sticks may be implemented, e.g., the sticks may be numbered from 1-7, etc.

In general, the stick-pile where all of sticks in a frame are off is an invalid character in any frame size. There are $2^N$, wherein 'N' is the number of sticks in the frame size, stick-piles in a given frame size. There may also be special cases that consist of a single block that cannot be valid in any frame size. As is shown in FIG. 1A, each of the stick-piles in a frame is assigned a number that corresponds to the summation of 2^(stick number) for each stick that is turned on. For example, as is shown in FIG. 1B, the stick-pile 108A for the character 'F' in a two row by one column frame has a stick-pile number of 15 in the two row by one column frame, i.e., $2^0+2^1+2^2+2^3=15$. Another example is shown in FIG. 1C, which is a stick-pile 108A for a somewhat crude representation of the character 'D' in a three row by two column stick frame. Using the stick numbering scheme that was chosen for the characters 'A' and 'F', this representation of 'D' has a stick-pile number of 39,631 (i.e., 2^0+2^1+2^2+2^3+2^6+2^7+2^9+2^11+2^12+2^15=39631) in a three row by two column stick frame. It should be appreciated that a large number of different routines may be designed to return a number of a character from frame size and stick status information for the character.

In general, a routine for providing a number of a character from its frame size and stick status information should also display pictures and associated numbers for any special cases, as noted above. The routine should also allow a user to enter a frame height and width of a character and a status of each stick in the character. When the combination of on-sticks is valid for the specified frame size, the routine proceeds through various frame sizes adding the number of valid characters in each frame size (that is not the same as the input frame size) to an accumulation sum, until the dimensions of the current frame match the dimension specified for the character. Next, the stick-pile number is calculated for the character that has the specified frame size, using a formula based on the input status of each stick. Finally, the number of valid stick-piles is calculated up to and including the input character stick-pile number. This number is then added to the accumulation sum from the frame matching process and the number of special cases minus one and then the sum is returned to the user as the number associated with the character.

Figure 1:
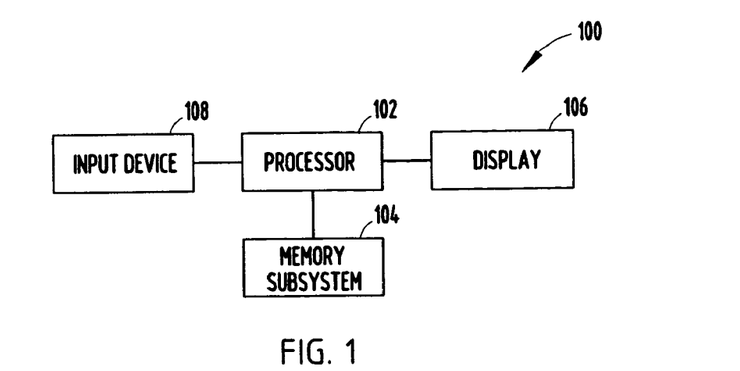
FIG. 1 is an electrical block diagram of an exemplary computer system.
Figure 1A:
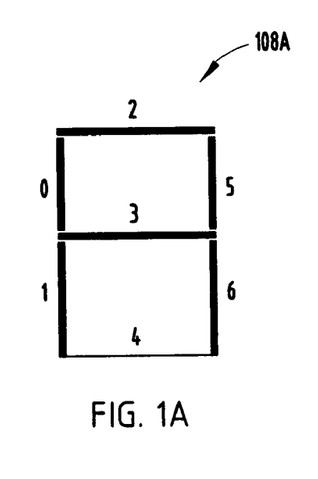
FIGS. 1A-1C are front views of programmable display devices displaying the characters 'A', 'F' and 'D', respectively.
Figure 1B:
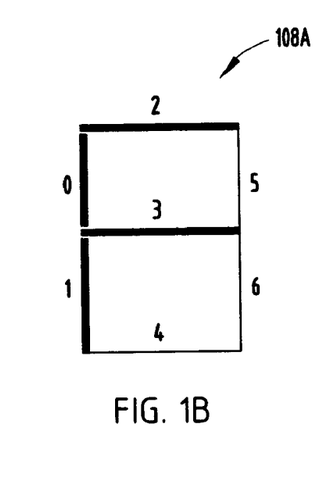
Figure 1C:
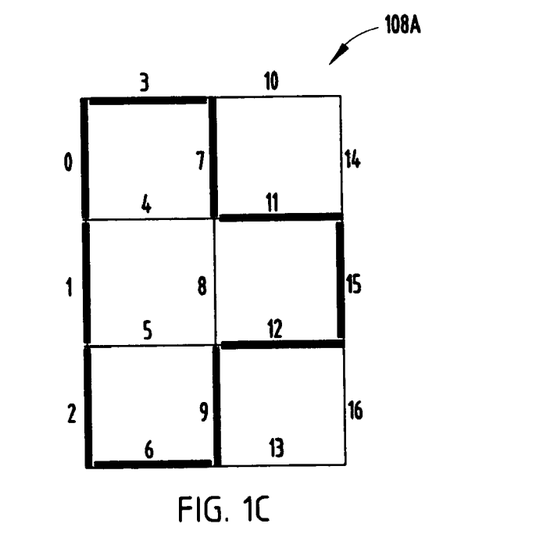

With reference to FIG. 1 an exemplary computer system 100 is depicted that includes a processor 102 coupled to a memory system subsystem 104, which includes an application appropriate amount of volatile and non-volatile memory. The processor 102 is also coupled to a display 106, e.g., a cathode ray tube (CRT) or liquid crystal display (LCD) display, and an input device 108, e.g., a keyboard including a plurality of keys. The keyboard may be configured to include a plurality of programmable display devices for selectively displaying different language characters (see, for example, FIGS. 1A-1C). An exemplary keyboard with programmable display devices is disclosed in U.S. Pat. No. 5,034,602 entitled "OPTICALLY ACTIVATED KEYBOARD FOR DIGITAL SYSTEM HAVING CHARACTER BACK LIGHTING," which issued Jul. 23, 1991, to Felix Garcia, Jr. et al. The disclosure of U.S. Pat. No. 5,034,602 is hereby incorporated herein by reference in its entirety.

Figure 2A:
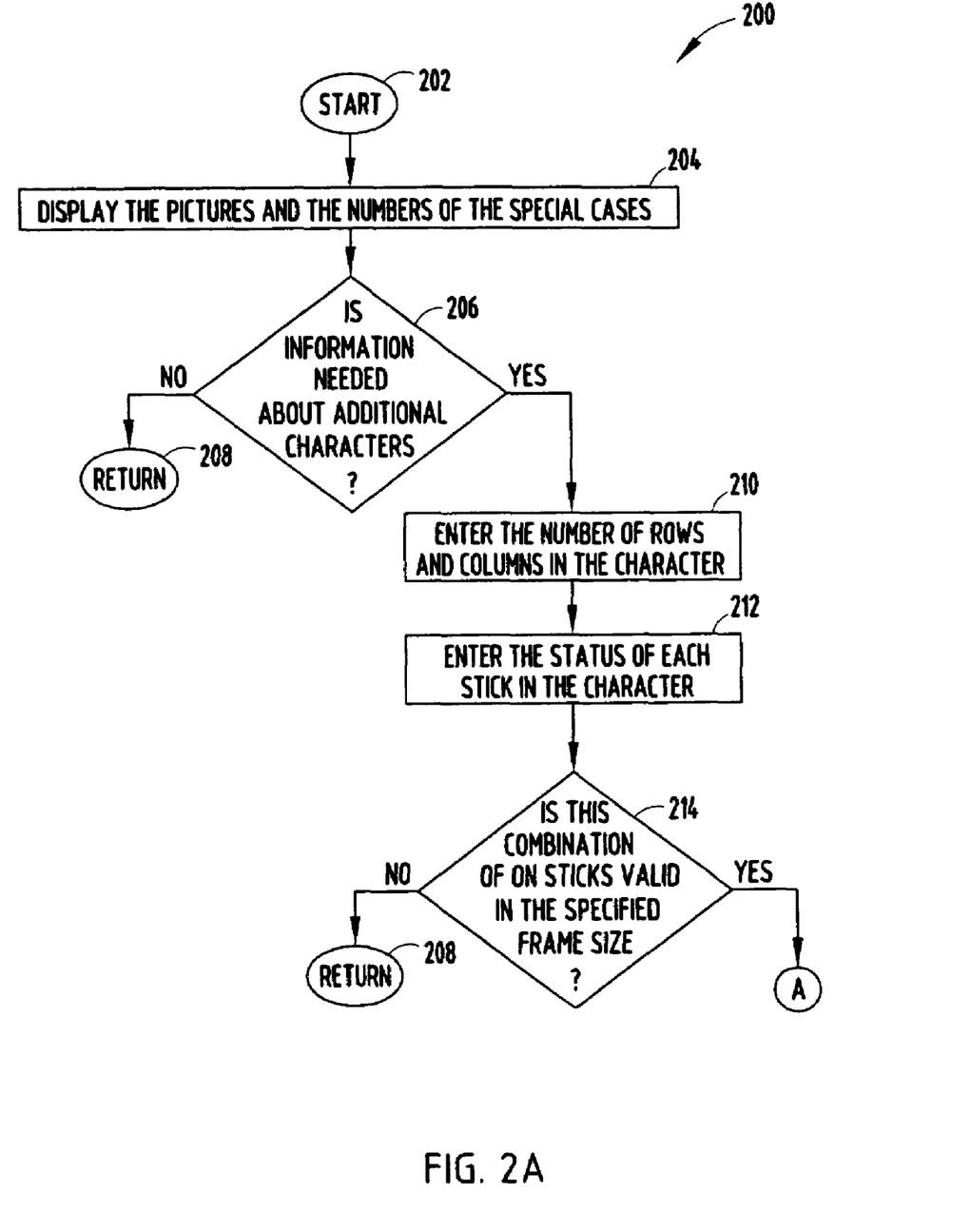
FIGS. 2A-2B are a flow diagram of a routine for retrieving a number of a character from its frame size and stick status information.
Figure 2B:
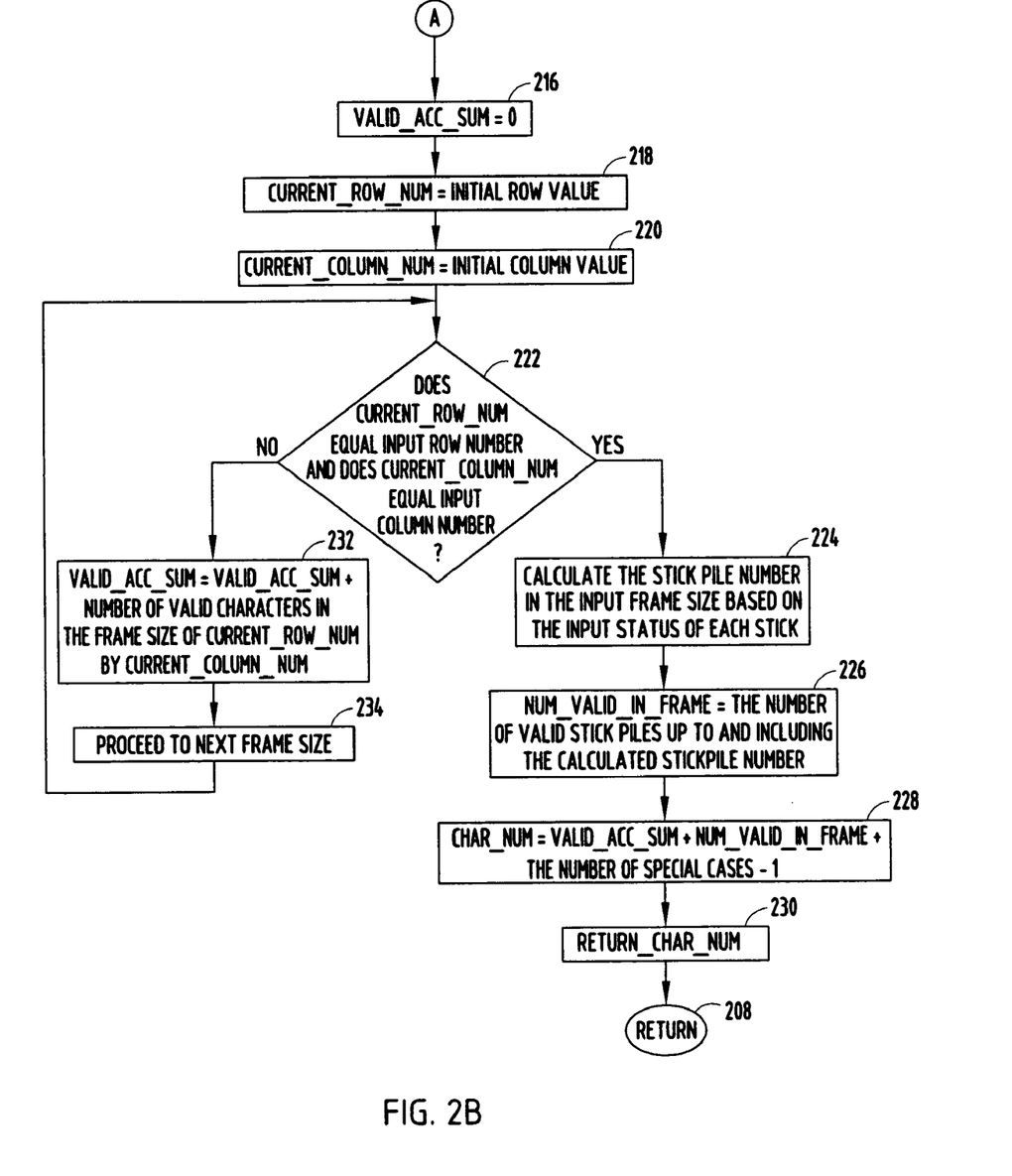

With reference to FIGS. 2A-2B, a number retrieving routine 200, for providing a number of a character from its frame size and stick status information, is depicted. In step 202, the routine 200 is initiated at which point control transfers to step 204, where pictures and numbers of special cases are displayed to a user of the computer system 100, on the display 106. Next, in decision step 206, the processor 102 (executing the routine 200) determines whether information is needed about additional characters. If not, control transfers from step 206 to step 208, where control returns to a calling routine. Otherwise, control transfers from step 206 to step 210, where a user of the computer system 100 enters the number of rows and columns, i.e., a frame size, of the character using, for example, a numeric keypad associated with the input device 108. Next, in step 212 the user enters the status of each stick in the character, at which point control transfers to decision step 214.

In step 214, the processor 102 determines whether the combination of sticks that are turned on (i.e., the on-sticks) is valid in the specified frame size. If the combination of on-sticks is not valid for the specified frame size then either the user is prompted to enter a combination of on-sticks that is valid or control transfers from step 214 to step 208, where control returns to a calling routine. In step 214, when the combination of on-sticks is valid for the specified frame size, control transfers to step 216, where the variable valid_ACC_sum is initialized to zero. This variable represents the number of valid stick-piles from the initial frame size up to but not including the frame size specified for the character.

Then, in step 218, the variable current_row_num (i.e., the current row number) is set equal to an initial row value. Next, in step 220 the variable current_column_num (i.e., the current column number) is set equal to an initial column value. Then, in decision step 222, the processor 102 determines whether the current row number is equal to the row number input by the user and whether the current column number is equal to the column number input by the user. If so, control transfers from step 222 to step 224, where the processor 102 calculates the stick-pile number, based on the input frame size (i.e., the number of rows and columns entered by the user) and the input status of each stick. Otherwise, control transfers from step 222 to step 232, where the processor 102 modifies the value of the variable valid_ACC_sum to be equal to the current value of the variable valid_ACC_sum plus the number of valid characters in a frame with the current frame size, i.e., a frame with a number of rows equal to current_row_num and a number of columns equal to current_column_num. Next, control transfers to step 234, where the processor 102 causes the next frame size to be selected, before returning to step 222.

As noted above, in step 222, when the current row and column numbers equal the row and column numbers input by the user, control transfers to step 224, where the processor 102 calculates the stick-pile number for the character based on the frame size and sticks that are turned on. Next, in step 226 the processor 102 sets the num_valid_in_frame variable equal to the number of valid stick-piles up to and including the calculated stick-pile number. Then, in step 228, the processor 102 calculates the character number (char_num) variable, which is equal to the value of the variable valid_ACC_sum plus the value of the variable num_valid_in_frame plus the value of the number of special cases minus one. Next, control transfers to step 230 where the processor 102 causes the character number to be returned (e.g., to a display routine that displays the character number on the display 106), at which point control transfers to step 208 where the routine 200 returns to the calling routine. Thus, according to the routine 200, a user can determine a number associated with a character from its frame size and its stick status information (i.e., what sticks are on), when desired.

Figure 3A:
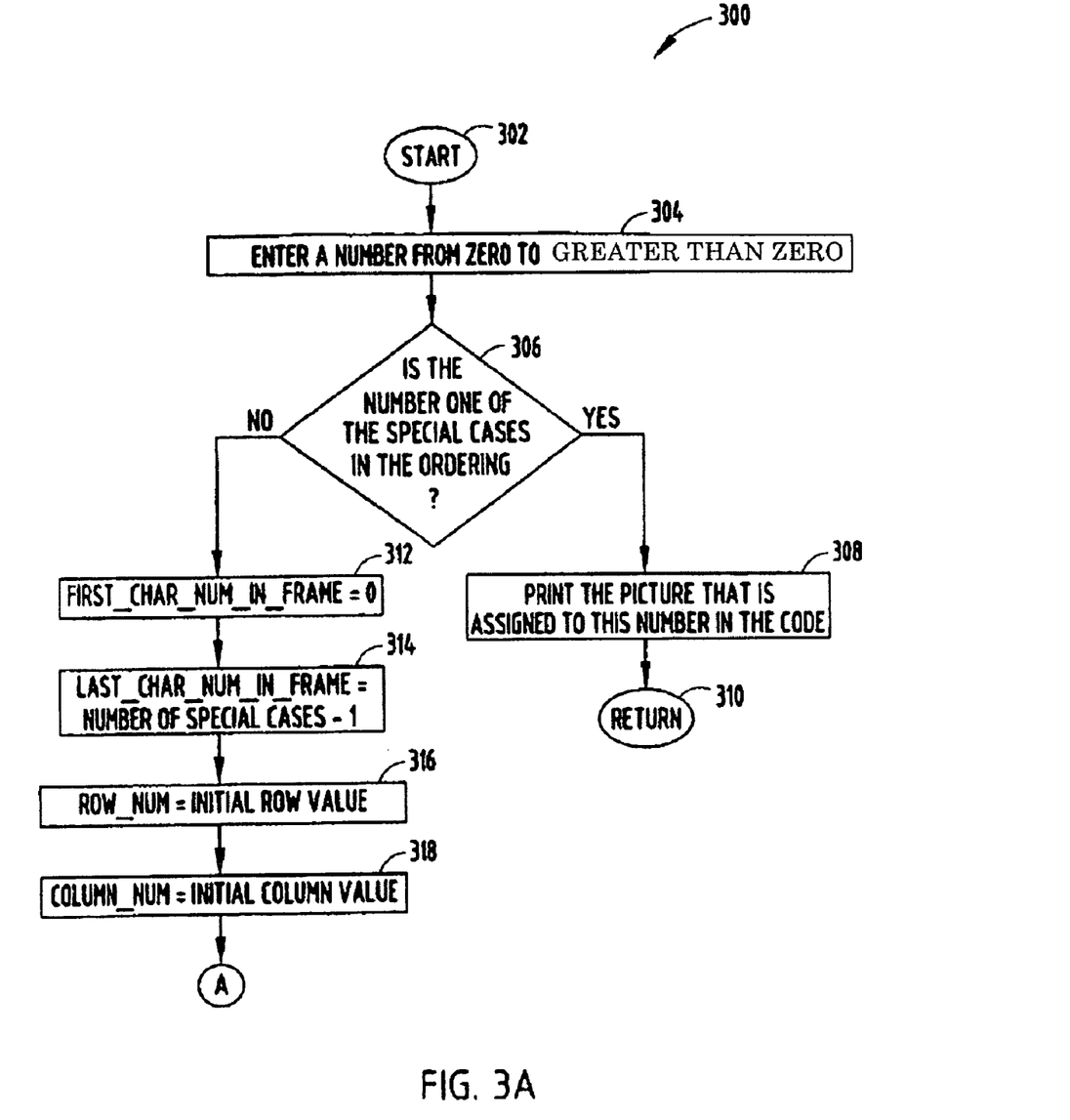
FIGS. 3A-3B are a flow routine for printing (displaying) a character from a number.
Figure 3B:
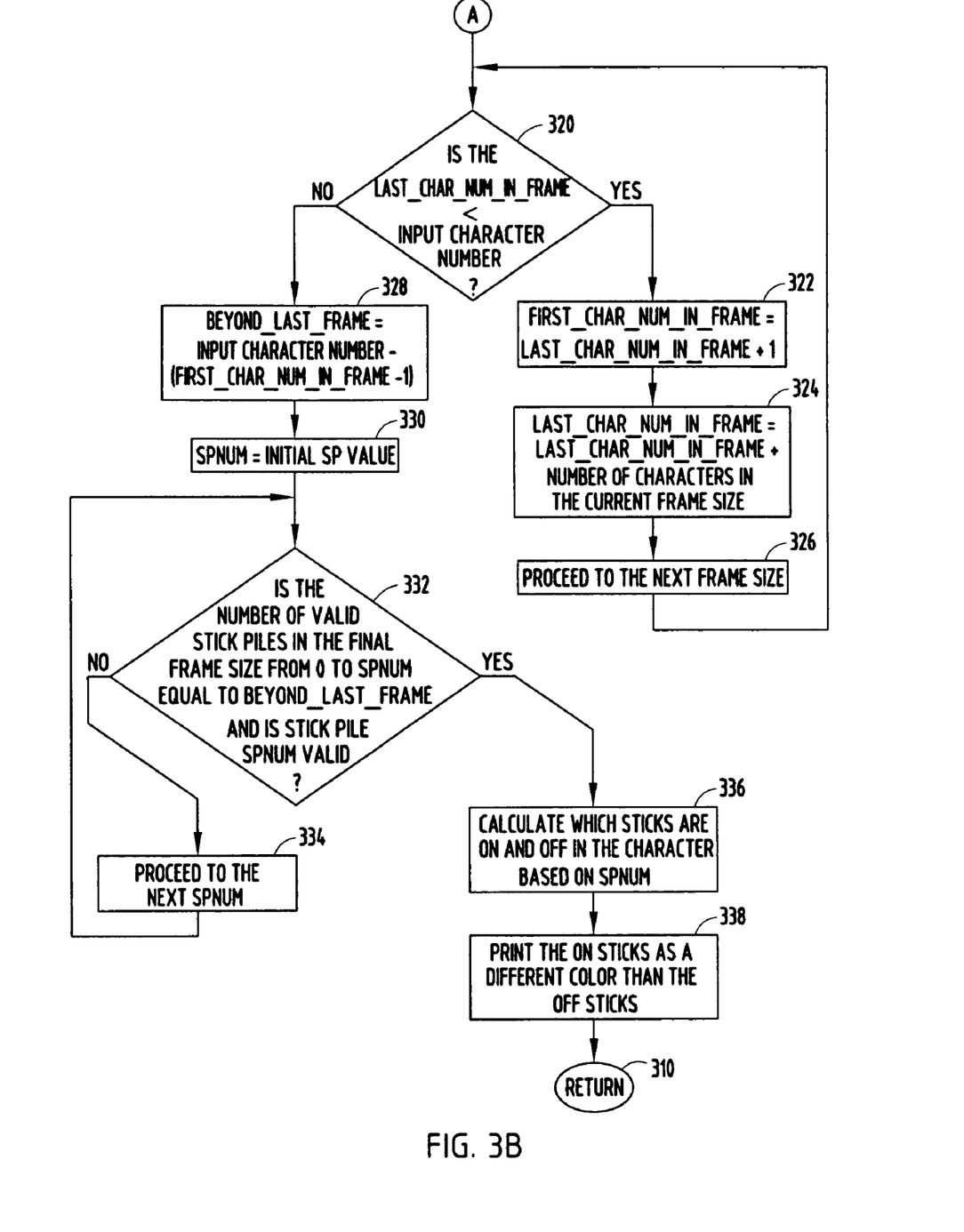

With reference to FIG. 3, a print routine 300 for printing a character from a number, according to another embodiment of the present invention, is depicted. In step 302, the routine 300 is initiated at which point control transfers to step 304. In step 304, the processor 102 (executing the routine 300) receives a number entered by the user, via the input device 108. Next, in decision step 306, the processor 102 determines whether the number is one of the special cases. If so, control transfers to step 308 where the processor 102 causes a picture that is assigned to the number to be printed (or displayed on the display 106), before transferring control to step 310, where the routine 300 returns to a calling routine.

In step 306, when the number is not one of the special cases, control transfers to step 312. In step 312, the variable first_char_num_in_frame is set equal to zero at which point control transfers to step 314, where the variable last_char_num_in_frame is set equal to the number of special cases minus one. Next, in step 316, the row number (row_num) variable is set to an initial row value. Then, in step 318, the column number (column_num) variable is set equal to an initial column value, at which point control transfers to decision step 320. In step 320, the processor 102 determines whether the last_char_num_in_frame variable is less than the number input by the user in step 304. If so, control transfers from step 320 to step 322, where the processor 102 sets the first_char_num_in_frame variable equal to the last_char_num_in_frame variable plus one. Next, in step 324, the processor 102 sets the last_char_number_in_frame variable equal to the last_char_number in the frame plus number of characters, i.e. valid stick-piles, in the current frame size. Next, control transfers to step 326 where the processor 102 proceeds to the next frame size, before returning control to step 320.

In step 320, when the last character number in the frame (last_char_in_frame) variable is not less than the number input by the user, control transfers to step 328 where the processor 102 sets the variable beyond_last_frame equal to the number input by the user minus the sum of the variable first_char_num_in_frame minus one. Next, control transfers to step 330 where the processor 102 sets the stick-pile number (spnum) variable equal to an initial stick-pile value, before transferring control to decision step 332.

In step 332, the processor 102 determines whether the number of valid stick-piles in the final frame size (from the stick-piles numbered zero to spnum) is equal to the variable beyond_last_frame and whether the stick-pile number is valid. If so, control transfers to step 336. Otherwise, control transfers from step 332 to step 334, where the processor 102 proceeds to another stick-pile number before returning control to step 332. In step 336, the processor 102 calculates which sticks are on and which sticks are off in the frame, based upon the stick-pile number. Next, in step 338 the routine prints (or displays) the sticks that are on (i.e., the on-sticks) as a different color or shade than the sticks that are off (off-sticks) before transferring control to step 310 where the routine returns to the calling routine.

To reiterate, a routine for printing (displaying) a character, based on a number entered by a user, first determines if the number corresponds to any of the special cases and, if so, the routine prints the number based on the picture coded to correspond to the number. Otherwise, if the number (and its associated character) is not one of the special cases, the routine determines the frame size for the number by proceeding through the various frame sizes (in some order) adding the number of valid characters in each frame size until an accumulation sum is greater than or equal to the number input by the user. The routine determines the position of the number in the final frame size by subtracting the last number in the previous frame size from the number input by the user. The routine then determines the stick-pile number that the character number would have in the final frame size. Utilizing the stick-pile number, the routine indicates which sticks of the character are on and which sticks are off. An area of a display apparatus is mapped and pixels are assigned to correspond to each stick of the character. The routine then changes the color of the pixels to differentiate on-sticks from off-sticks to display the character. In a similar manner, a routine, when executed, may be employed to customize a keyboard that includes a plurality of display devices, each associated with a key of the keyboard, to provide a desired language character for each of the keys.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method for storing displayable computer text, comprising the steps of:

assigning each of a plurality of language characters to an appropriate sized stick frame in order to provide a different graphical representation for each of the language characters, wherein the stick frame includes a plurality of vertical and horizontal segments;

entering a frame height and a frame width for each of the language characters that are to be defined, wherein the frame height defines the number of the plurality of vertical segments in the stick frame from top to bottom and the frame width defines the number of the plurality of horizontal segments in the stick frame from left to right;

determining which of the vertical and horizontal segments are on and which of the vertical and horizontal segments are off in the stick frame for each of the language characters; and assigning a different number to each of the language characters based upon the size of the stick frame used to represent each of the characters and the status of each of the vertical and horizontal segments in the stick frame for each of the characters.

2. The method of claim 1, wherein the language characters includes a plurality of language symbols.

3. The method of claim 1, wherein the step of assigning a different number to each of the language characters based upon the size of the stick frame and the status of each of the vertical and horizontal segments in the stick frame further comprises the step of:

determining the different number for each of the language characters based upon a location of each stick in the stick frame that is on, wherein the stick corresponds to one of the vertical and horizontal segments.

4. The method of claim 3, further comprising the step of:

verifying that the assigned different number for each of the language characters is valid for an entered frame height and width.

5. The method of claim 1, wherein each of the vertical and horizontal segments include a predetermined number of display pixels.

6. The method of claim 1, wherein the different graphical representation of each of the language characters is provided on one of a multi-segment light-emitting diode (LED) display and a liquid crystal diode (LCD) display.

* * * * *

UNITED STATES PATENT AND TRADEMARK OFFICE
CERTIFICATE OF CORRECTION

PATENT NO. : 7,292,248 B2 Page 1 of 1
APPLICATION NO. : 11/048203
DATED : November 6, 2007
INVENTOR(S) : John T. Mellema It is certified that error appears in the above-identified patent and that said Letters Patent is hereby corrected as shown below:

Column 3, Line 10;

"tat" should be --that --,

Column 3, Line 15;

"bach" should be --each--,

Column 3, Line 21;

delete "20 +21 +23 +24 +25 +25 +26 = 111"

replace with --20 +21 +22 +23 +25 +26 = 111--, and

Column 3, Line 22;

"tat" should be --that--.

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,292,248 B2
APPLICATION NO. : 11/048203
DATED : November 6, 2007
INVENTOR(S) : John T. Mellema It is certified that error appears in the above-identified patent and that said Letters Patent is hereby corrected as shown below:

Column 3, line 10;

"tat" should be --that--,

Column 3, Line 15;

"bach" should be --each--,

Column 3, Line 21;

delete "20 +21 +23 +24 +25 +25 +26 = 111"

replace with --20 +21 +22 +23 +25 +26 = 111--, and

Column 3, Line 22;

"tat" should be --that--.

Signed and Sealed this

Thirteenth Day of May, 2008

JON W. DUDAS
*Director of the United States Patent and Trademark Office*